United States Patent
Koskey, Jr.

(10) Patent No.: US 9,924,697 B1
(45) Date of Patent: Mar. 27, 2018

(54) WINDOW SHELF SYSTEM AND CAT PERCH

(71) Applicant: James Donald Koskey, Jr., Manitou Springs, CO (US)

(72) Inventor: James Donald Koskey, Jr., Manitou Springs, CO (US)

(73) Assignee: K&H Manufacturing, LLC., Colorado Springs, CO (US)

( * ) Notice: Subject to any disclaimer, the term of this patent is extended or adjusted under 35 U.S.C. 154(b) by 0 days.

(21) Appl. No.: 14/564,236

(22) Filed: Dec. 9, 2014

(51) Int. Cl.
*A01K 1/035* (2006.01)
*E06B 7/28* (2006.01)

(52) U.S. Cl.
CPC ............... *A01K 1/035* (2013.01); *E06B 7/28* (2013.01)

(58) Field of Classification Search
CPC .... A01K 1/035; A01K 1/0353; A01K 15/024; A01K 1/033; A01K 31/12; A47B 43/006; A47B 96/16
USPC ......................................... 119/28.5, 484, 485
See application file for complete search history.

(56) References Cited

U.S. PATENT DOCUMENTS

| | | | | |
|---|---|---|---|---|
| 2,205,193 A | * | 6/1940 | Goldman | A47B 43/006 108/135 |
| 4,057,031 A | * | 11/1977 | Williams | A01K 1/0353 119/28.5 |
| 4,261,294 A | * | 4/1981 | Bescherer | A01K 39/0206 119/57.8 |
| 4,820,556 A | * | 4/1989 | Goldman | A01K 63/006 119/253 |
| 5,509,373 A | * | 4/1996 | Elesh | A01K 1/035 119/28.5 |
| 5,794,385 A | * | 8/1998 | Donovan | A47B 96/16 108/134 |
| 5,809,933 A | * | 9/1998 | Conwell, III | A01K 15/02 119/28.5 |
| 5,904,330 A | * | 5/1999 | Manico | A01K 39/00 119/51.01 |
| 6,360,689 B1 | * | 3/2002 | Weinert | A01K 1/033 119/475 |
| 6,574,924 B2 | * | 6/2003 | Maniezzo | A47F 5/0823 211/90.01 |
| 6,857,394 B2 | * | 2/2005 | Redford | A01K 31/12 119/537 |
| 6,913,412 B1 | * | 7/2005 | Byers | A47K 3/001 16/82 |
| 7,934,470 B1 | * | 5/2011 | Barker | A01K 1/035 119/28.5 |
| 8,393,113 B2 | * | 3/2013 | Rex | A47B 96/00 47/66.6 |
| 8,607,995 B1 | * | 12/2013 | Mladinich | A47G 29/1223 211/104 |

(Continued)

*Primary Examiner* — Yvonne R Abbott-Lewis
(74) *Attorney, Agent, or Firm* — Ice Miller, LLP; Siddharth Bose

(57) ABSTRACT

A cat perch has a first set of suction cups. Each of the suction cups has a nipple with a hole extending through the nipple. A shelf has a first edge and a second edge. The first edge has a pin that extends through the hole in the nipple of one of the first set of suction cups. A set of straps extend from the second edge of the shelf to a second set of suction cups. Because the shelf is connected to the suction cups by a pin extending through the hole in the nipple of the suction cup, the shelf can be folded up and out of the way.

19 Claims, 4 Drawing Sheets

(56) References Cited

U.S. PATENT DOCUMENTS

| | | | |
|---|---|---|---|
| 8,960,457 B2 * | 2/2015 | Brisendine | A47B 43/006 211/113 |
| 2008/0000428 A1 * | 1/2008 | Cody | A01K 1/0272 119/28.5 |

* cited by examiner

WINDOW SHELF SYSTEM AND CAT PERCH

RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

The inside of windows are often an ideal place for a shelf or a pet perch. These windows receive light and warmth from the sun that cats and plants both enjoy. There have been a number of attempts to create a window shelf. Most have used suction cups to attach the shelf to the window. One problem with many of these solutions is that they are unstable to lateral movement. As a result, when a cat jumps onto the perch it swings along the window, which can cause the glass to scratch and to make a screeching sound. Another problem is that some of these systems are quite bulky and therefore expensive to ship. Another problem that is common to all these solutions is that interfere with the window covering associated with the window.

Thus there exists a need for window shelf system and cat perch that does not interfere with function of the window coverings, is inexpensive to ship and has lateral stability.

BRIEF SUMMARY OF INVENTION

A cat perch that overcomes these and other problems includes a first set of suction cups, each of the suction cups having a nipple with a hole extending through the nipple. A shelf has a first edge and a second edge. The first edge has a pin that extends through the hole in the nipple of one of the first set of suction cups. A second set of suction cups is provided. A set of straps extend from the second edge of the shelf to the second set of suction cups. Because the shelf is connected to the suction cups by a pin extending through a hole in the nipple of the suction cup, the shelf can be folded up and out of the way. The shelf has an opening where the straps connect to the shelf and the straps can be feed through these holes as the shelf is folded into the retracted position. In one case the straps are slightly wider than the opening of the hole and this creates friction that holds the shelf in the raise position.

The only rigid part of the system is the shelf. As a result, the system forms a very compact package for shipping. This reduces the cost of shipping.

The use of multiple suction cups in the lateral direction prevents the shelf from moving laterally if a cat jumps onto the perch.

DETAILED DESCRIPTION OF THE INVENTION

The invention is directed to a cat perch that has a first set of suction cups. Each of the suction cups has a nipple with a hole extending through the nipple. A shelf has a first edge and a second edge. The first edge has a pin that extends through the hole in the nipple of one of the first set of suction cups. A second set of suction cups is provided. A set of straps extend from the second edge of the shelf to the second set of suction cups. Because the shelf is connected to the suction cups by a pin extending through the hole in the nipple of the suction cup, the shelf can be folded up and out of the way. The shelf has an opening where the straps connect to the shelf and the straps can be feed through these holes as the shelf is folded into the retracted position. In one case the straps are slightly wider than the opening of the hole and this creates friction that holds the shelf in the raise position.

The only rigid part of the system is the shelf. As a result, the system forms a very compact package for shipping. This reduces the cost of shipping.

The use of multiple suction cups in the lateral direction prevents the shelf from moving laterally if a cat jumps onto the perch.

Figure 1:
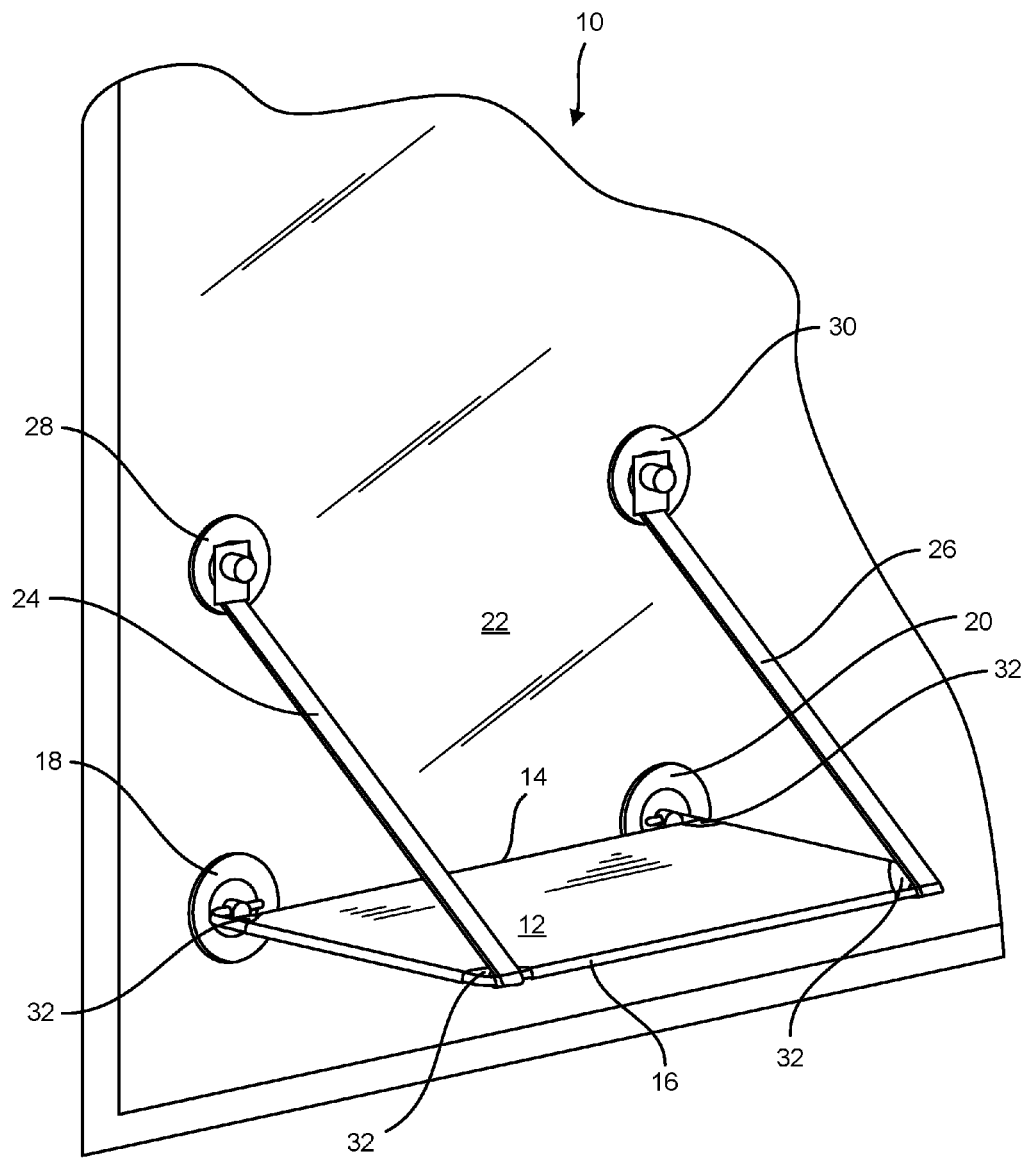
FIG. 1 is a top left perspective view of a window shelf system in accordance with one embodiment of the invention.

FIG. 1 is a top left perspective view of a window shelf system 10 in accordance with one embodiment of the invention. The window shelf system 10 has a shelf 12 with a first edge 14 and a second edge 16. The first edge 14 is hingedly attached to a first set of suction cups 18, 20. The first set of suction cups 18, 20 are attached a window 22. A second edge 16 of the shelf 12 is attached to a set of straps 24, 26. The other end of the straps 24, 26 are attached to a second set of suction cups 28, 30. The second set of suction cups 28, 30 are also attached to the window 22 and positioned so the shelf 12 is roughly perpendicular to the window 22 when it is in the operating position. Note that the shelf 12 has a plurality of holes 32, particularly where the straps 24, 46 attach to the shelf and in all four corners in one embodiment.

Figure 2:
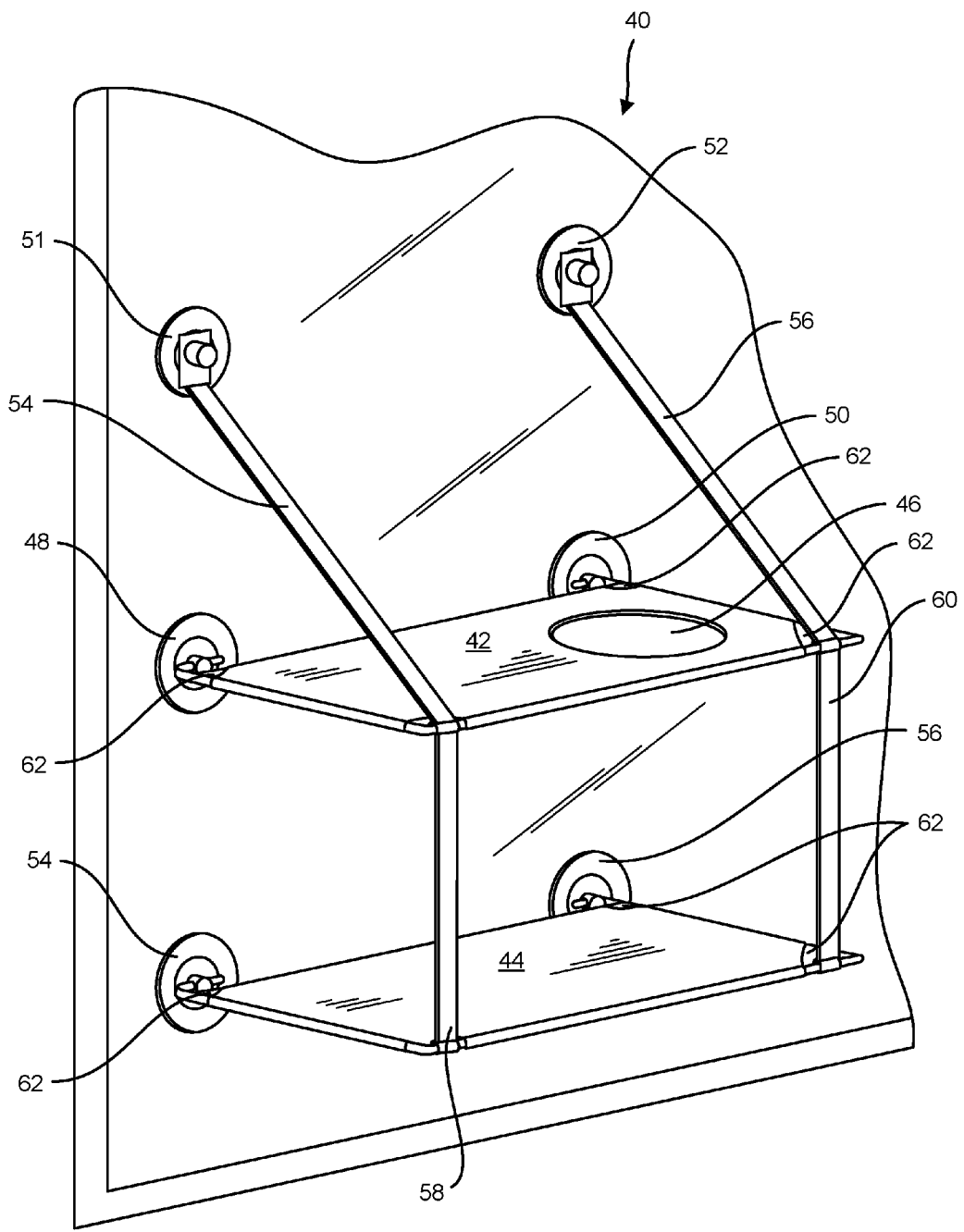
FIG. 2 is a top left perspective view of a window shelf system in accordance with one embodiment of the invention.

FIG. 2 is a top left perspective view of a window shelf system 40 in accordance with one embodiment of the invention. This embodiment shows a pair of shelves 42, 44. The first shelf 42 works essentially the same as the shelf in FIG. 1 except that it has a pet hole 46 in it. The hole is sized so a cat can crawl through the hole in one embodiment. It has a first set of suction cups 48, 50 attached to the shelf 42 and a second set of suction cups 51, 52 attached to the shelf 42 by straps 54, 56. A second shelf 44 is attached to the window by a third set of suction cups 54, 56. A second set of straps 58, 60 attach the first shelf 42 to the second shelf 44. Note that while only a pair of straps are shown in each set more could be used and still be within the invention. The same applies to the sets of suction cups. Note that this embodiment also has holes 62 where the straps are connected and the straps can extend through the holes 62.

Figure 3:
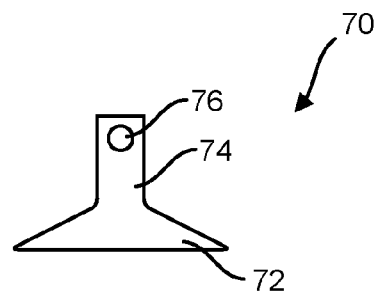
FIG. 3 is a side view of a suction cup in accordance with one embodiment of the invention.

FIG. 3 is a side view of a suction cup 70 in accordance with one embodiment of the invention. While all the suction cups may be in the form shown in FIG. 3 this embodiment is particularly directed to the suction cups 18, 20, 48, 50, 54, 56 have this form. In other words only the suction cups connected to the shelf or shelves. The suction cup 70 has a base 72 and nipple 74. A hole 76 extends through the nipple 74.

Figure 4:
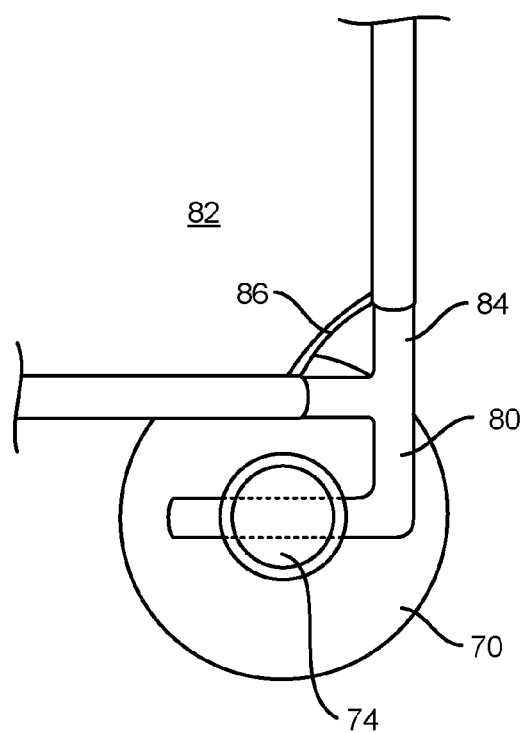
FIG. 4 is a cutaway view of a suction cup and shelf pin in accordance with one embodiment of the invention.
Figure 5:
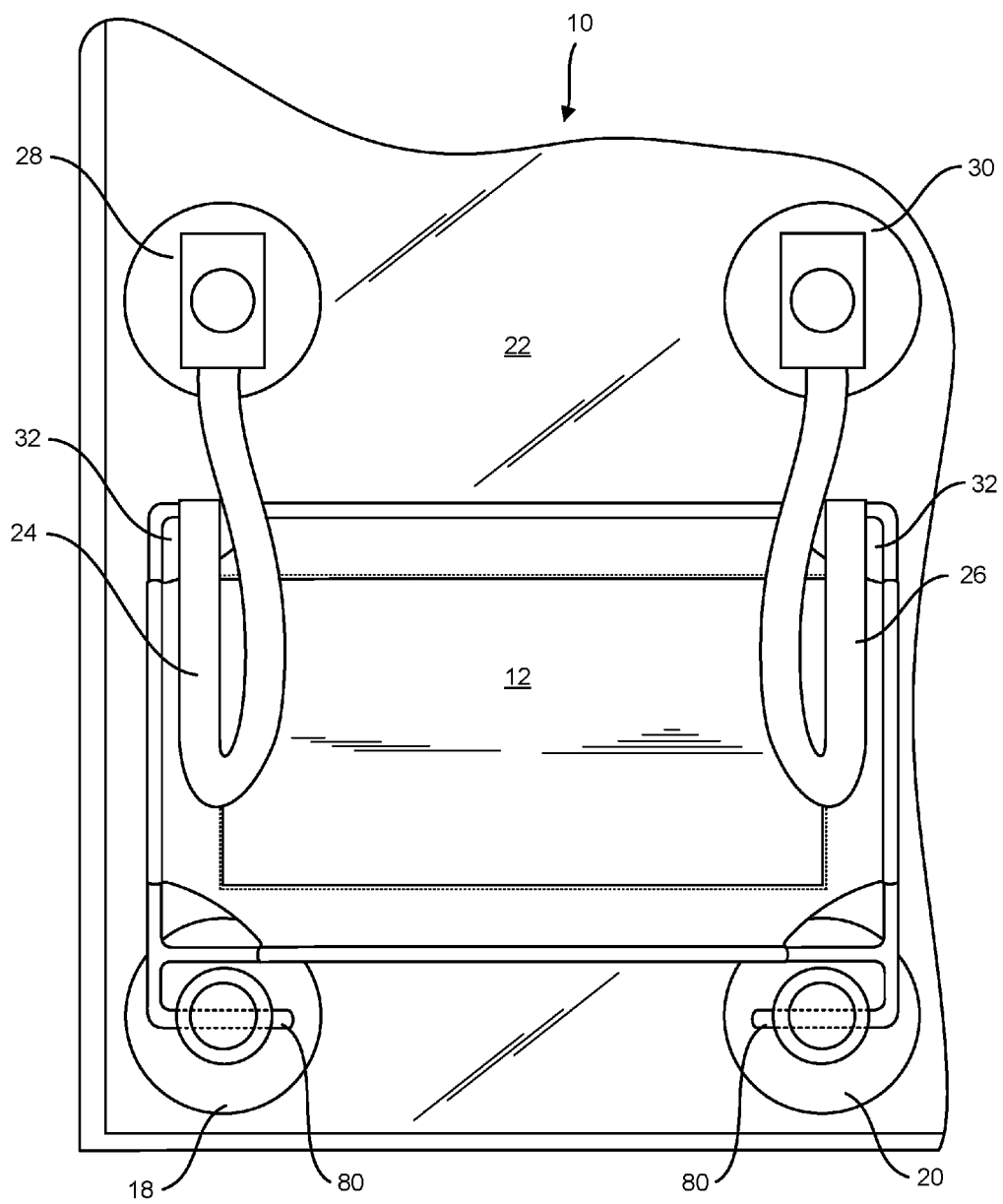
FIG. 5 is a top left perspective view of a window shelf system in a folded position in accordance with one embodiment of the invention.

FIG. 4 is a cutaway view of a suction cup 70 and a shelf pin 80 in accordance with one embodiment of the invention. The shelf pin 80 extends through the hole 76 in the nipple 74 to make a hinged connection. This is only one embodiment of how a hinged connection that may be used. Note in this Figure the shelf 82 is in a folded position (See. FIG. 5). The shelf 82 has a frame 84, which may be a wire rod frame. Canvas or some other material such as carpeting is stretched across the frame 84 and sewn 86 to the frame 84. However, other materials can be used to form the shelf.

FIG. 5 is a top left perspective view of a window shelf system 10 in a folded position in accordance with one embodiment of the invention. As can be seen the straps 24, 26 have been pulled through the openings 32. In one embodiment, the straps 24, 26 are somewhat stiff and slightly wider than the openings 32. As a result, the friction holds the shelf 12 up in a stowed position in which the shelf is roughly parallel to the window. In this position, the window coverings can be operated unimpeded.

Thus there has been described a window shelf system and cat perch that does not interfere with function of the window coverings, is inexpensive to ship and has lateral stability.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A cat perch comprising:
   a first set of suction cups, each of the suction cups having a nipple with a hole extending through the nipple;
   a shelf having a first edge and a second edge, the first edge having at least one pin that extends through the hole in the nipple of at least one of the first set of suction cups;
   a second set of suction cups; and
   a set of straps extending from the second edge of the shelf to the second set of suction cups.

2. The cat perch of claim 1, wherein the shelf has at least a pair of openings where the set of straps are attached to the shelf.

3. The cat perch of claim 1, further including a second shelf and a second set of straps connecting the second shelf to the first shelf.

4. The cat perch of claim 3, further including a third set of suction cups connected to the second shelf.

5. The cat perch of claim 4, wherein the third set of suction cups have a nipple with a hole extending through the nipple.

6. The cat perch of claim 5, wherein the first shelf has a frame and a carpet stretched across the frame.

7. The cat perch 6, wherein the carpet has a hole sized for a cat.

8. The cat perch of claim 1, wherein the shelf has a first position wherein the shelf is roughly perpendicular to a plane formed by the first set of suction cups and the second set of suction cups and a second position in which the shelf is roughly parallel to the plane formed by the first set of suction cups and the second set of suction cups.

9. A window shelf system, comprising:
   a first set of suction cups attached to a window;
   a second set of suction cups attached to the window;
   a shelf hingedly attached to the second set of suction cups; and
   a set of straps extending from the first set of suction cups to the shelf.

10. The window shelf system of claim 9, wherein the shelf has a set of holes where the set of straps attach to the shelf.

11. The window shelf system of claim 9, wherein the shelf has a first position wherein the shelf is roughly perpendicular to a plane formed by the first set of suction cups and the second set of suction cups and a second position in which the shelf is roughly parallel to the plane formed by the first set of suction cups and the second set of suction cups.

12. The window shelf system of claim 9, further including a second shelf attached to the first shelf by a second set of straps.

13. The window shelf system of claim 12, further including a third set of suction cups connected to the second shelf.

14. The window shelf system of claim 13, wherein the shelf has a hole sized for a cat.

15. A method of operating a window cat perch, comprising the steps of:
   hingedly attaching a first set of suction cups to a shelf;
   attaching a first end of a set of straps to a second set of suction cups; and
   attaching the first set of suction cups and the second set of suction cups to a window.

16. The method of claim 15, further including the step of attaching a second end of the set of straps to the shelf.

17. The method of claim 16, moving the shelf from a first position to a second position, wherein the first position wherein the shelf is roughly perpendicular to a plane formed by the first set of suction cups and the second set of suction cups and the second position in which the shelf is roughly parallel to the plane formed by the first set of suction cups and the second set of suction cups.

18. The method of claim 15, further including the steps of:
   attaching a third set of suction cups to a second shelf;
   attaching the third set of suction cups to the window.

19. The method of claim 18, further including the steps of:
   attaching a second set of straps between the shelf and the second shelf.

\* \* \* \* \*